US009489197B2

(12) United States Patent
Rahman et al.

(10) Patent No.: US 9,489,197 B2
(45) Date of Patent: Nov. 8, 2016

(54) HIGHLY EFFICIENT DIFFERENT PRECISION COMPLEX MULTIPLY ACCUMULATE TO ENHANCE CHIP RATE FUNCTIONALITY IN DSSS CELLULAR SYSTEMS

(71) Applicant: Texas Instruments Incorporated, Dallas, TX (US)

(72) Inventors: Mujibur Rahman, Plano, TX (US); Peter Richard Dent, Northamptonshire (GB); Timothy David Anderson, University Park, TX (US); Duc Quang Bui, Grand Prairie, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 215 days.

(21) Appl. No.: 14/327,022

(22) Filed: Jul. 9, 2014

(65) Prior Publication Data
US 2015/0019842 A1    Jan. 15, 2015

Related U.S. Application Data

(60) Provisional application No. 61/844,142, filed on Jul. 9, 2013.

(51) Int. Cl.
*G06F 17/15* (2006.01)
*G06F 9/30* (2006.01)
*G06F 9/38* (2006.01)

(52) U.S. Cl.
CPC ........... *G06F 9/3001* (2013.01); *G06F 9/3013* (2013.01); *G06F 9/30036* (2013.01); *G06F 9/30094* (2013.01); *G06F 9/3853* (2013.01); *G06F 9/3895* (2013.01); *G06F 17/15* (2013.01)

(58) Field of Classification Search
None
See application file for complete search history.

(56) References Cited

U.S. PATENT DOCUMENTS

| 8,320,258 | B2 * | 11/2012 | Mohr | H04B 1/70752 370/241 |
| 2003/0052711 | A1 * | 3/2003 | Taylor | G06F 17/15 326/38 |
| 2003/0202569 | A1 * | 10/2003 | Kim | G06F 17/15 375/150 |
| 2006/0271764 | A1 * | 11/2006 | Nilsson | G06F 9/30014 712/34 |
| 2007/0198815 | A1 * | 8/2007 | Liu | G06F 7/4812 712/221 |
| 2008/0008230 | A1 * | 1/2008 | Lee | H04B 1/707 375/150 |
| 2009/0106341 | A1 * | 4/2009 | Al Adnani | G06F 17/142 708/404 |

OTHER PUBLICATIONS

A. Nilsson and D. Liu, "Area efficient fully programmable baseband processors," Proceedings of International Symposium on Systems, Architectures, Modeling and Simulation (SAMOS) VII Workshop, Jul. 2007.*

* cited by examiner

*Primary Examiner* — Matthew Sandifer
(74) *Attorney, Agent, or Firm* — Robert D. Marshall, Jr.; Frank D. Cimino

(57) ABSTRACT

This invention is a digital signal processor capable of performing correlation of data with pseudo noise for code division multiple access (CDMA) decoding using clusters. Each cluster includes plural multipliers. The multipliers multiply real and imaginary parts of packed data by corresponding pseudo noise data. Within a cluster the real parts and the imaginary parts of the products are summed separately. This forms plural complex number outputs equal in number to the number of clusters. The pseudo noise data is offset relative to the data input differing amounts for different clusters. The clusters are divided into first half clusters receiving data from even numbered slots and second half clusters receiving data from odd numbered slots. The correlation unit includes a mask input to selectively zero a multiplier product.

9 Claims, 11 Drawing Sheets

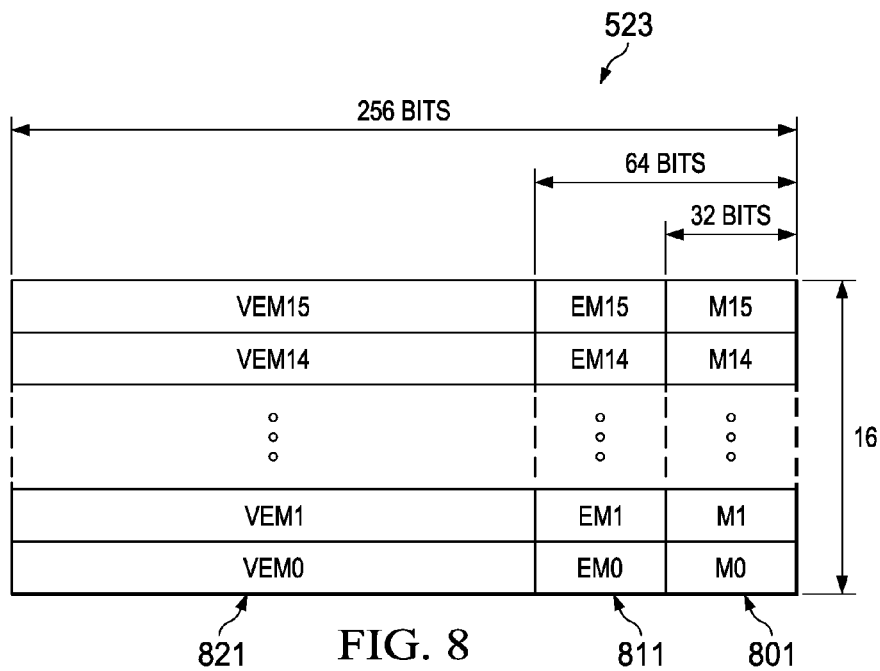
FIG. 8
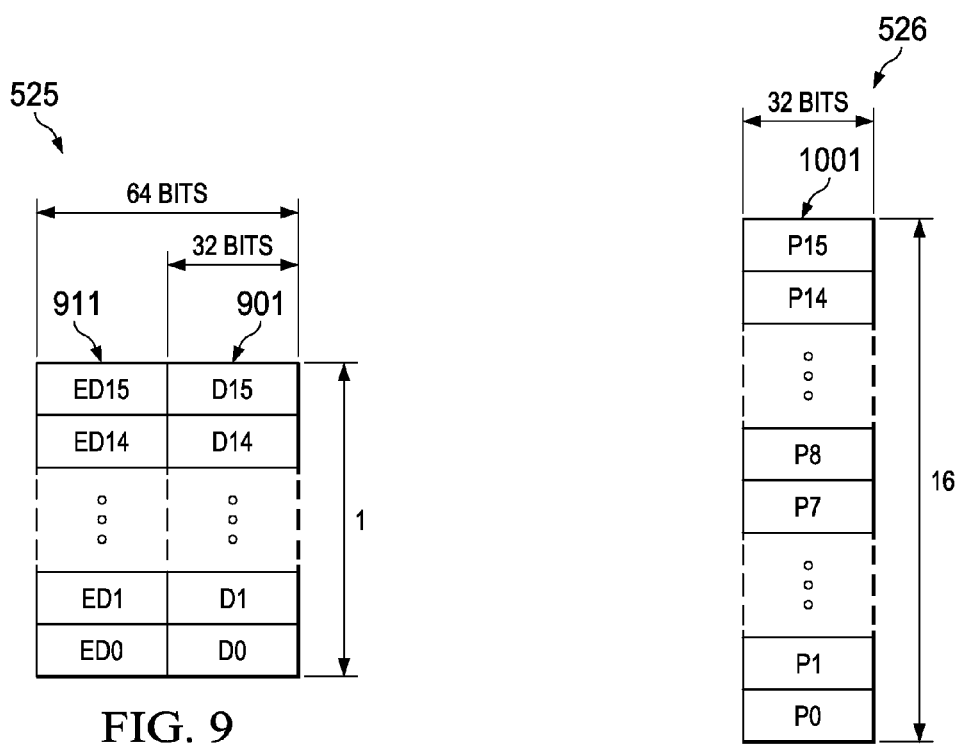
FIG. 9
FIG. 10

HIGHLY EFFICIENT DIFFERENT PRECISION COMPLEX MULTIPLY ACCUMULATE TO ENHANCE CHIP RATE FUNCTIONALITY IN DSSS CELLULAR SYSTEMS

CLAIM OF PRIORITY

This application claims priority under 35 U.S.C. 119(e)(1) to U.S. Provisional Application No. 61/844,142 filed Jul. 9, 2013.

TECHNICAL FIELD OF THE INVENTION

The technical field of this invention is digital data processing and more specifically complex multiply operations.

BACKGROUND OF THE INVENTION

Prior Art uses separate accelerator to do chip rate functionality. This prior art requires interface buffers and logic between the DSP and the accelerator. The accelerator typically runs at a much lower clock speed than DSP. This is not efficient in terms of power, performance and area.

SUMMARY OF THE INVENTION

This invention is a digital signal processor capable of performing correlation of data with pseudo noise for code division multiple access (CDMA) decoding. This is part of a correlation unit within the instruction set architecture (ISA) of the digital signal processor.

The correlation is computed using clusters. Each cluster includes plural multipliers. The multipliers multiply real and imaginary parts of packed data by corresponding pseudo noise data. Within a cluster the real part of the products are summed separately from the imaginary part of the products. This forms plural complex number outputs equal in number to the number of clusters. The pseudo noise data is offset relative to the data input differing amounts for different clusters. The clusters are divided into first half clusters receiving data from even numbered slots and second half clusters receiving data from odd numbered slots. The correlation unit further enables a mask input to selectively zero a multiplier product. The multipliers are simplified based upon the limitations of the pseudo noise data.

BRIEF DESCRIPTION OF THE DRAWINGS

These and other aspects of this invention are illustrated in the drawings, in which:

FIG. 8 illustrates the local vector register file shared by the multiply and correlation functional units;

FIG. 9 illustrates local register file of the load/store unit;

FIG. 10 illustrates the predicate register file;

DETAILED DESCRIPTION OF PREFERRED EMBODIMENTS

Figure 1:
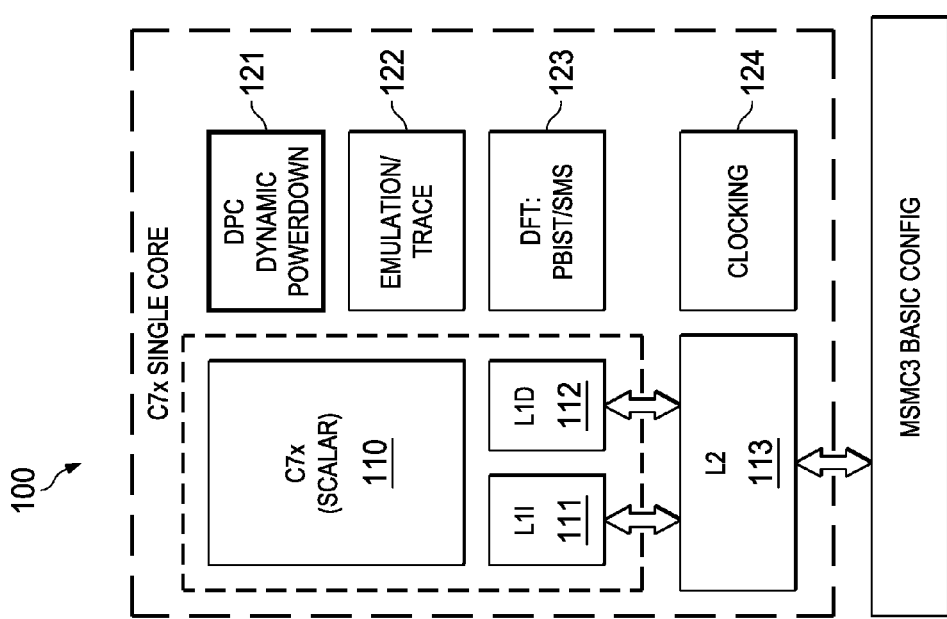
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
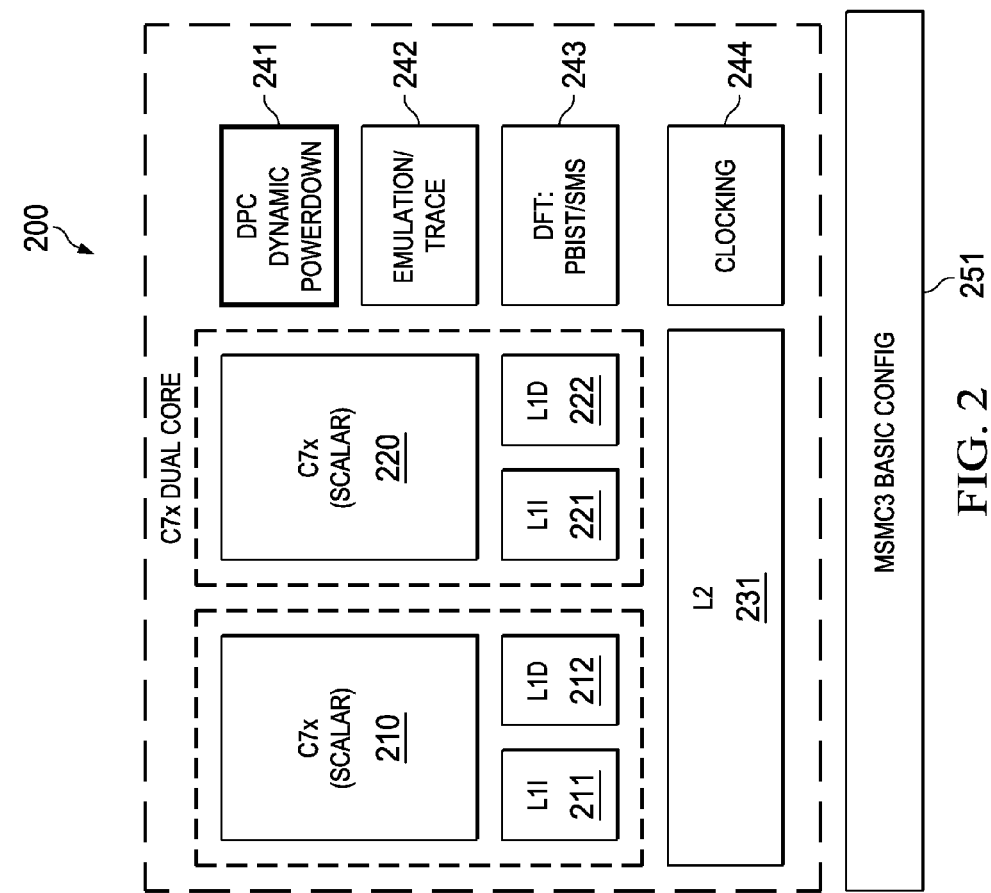
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
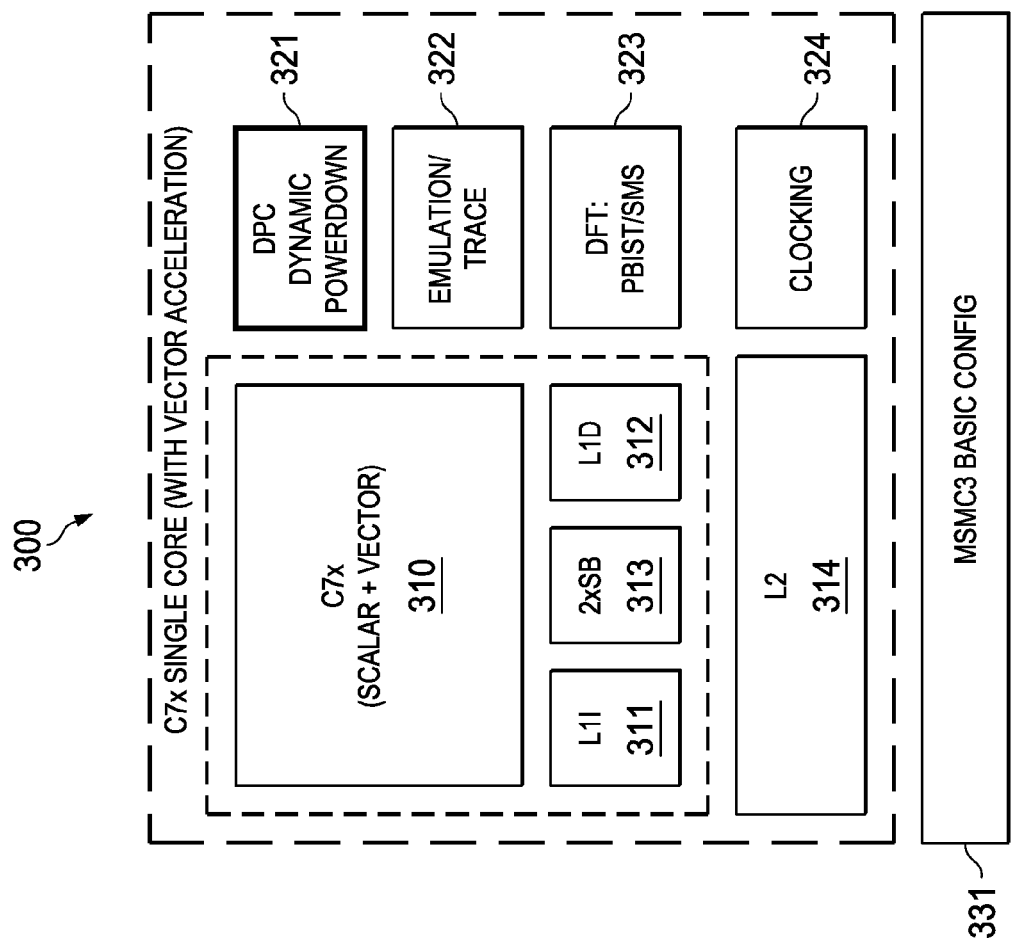
FIG. 3 illustrates a single core vector processor according to a further embodiment of this invention.
Figure 4:
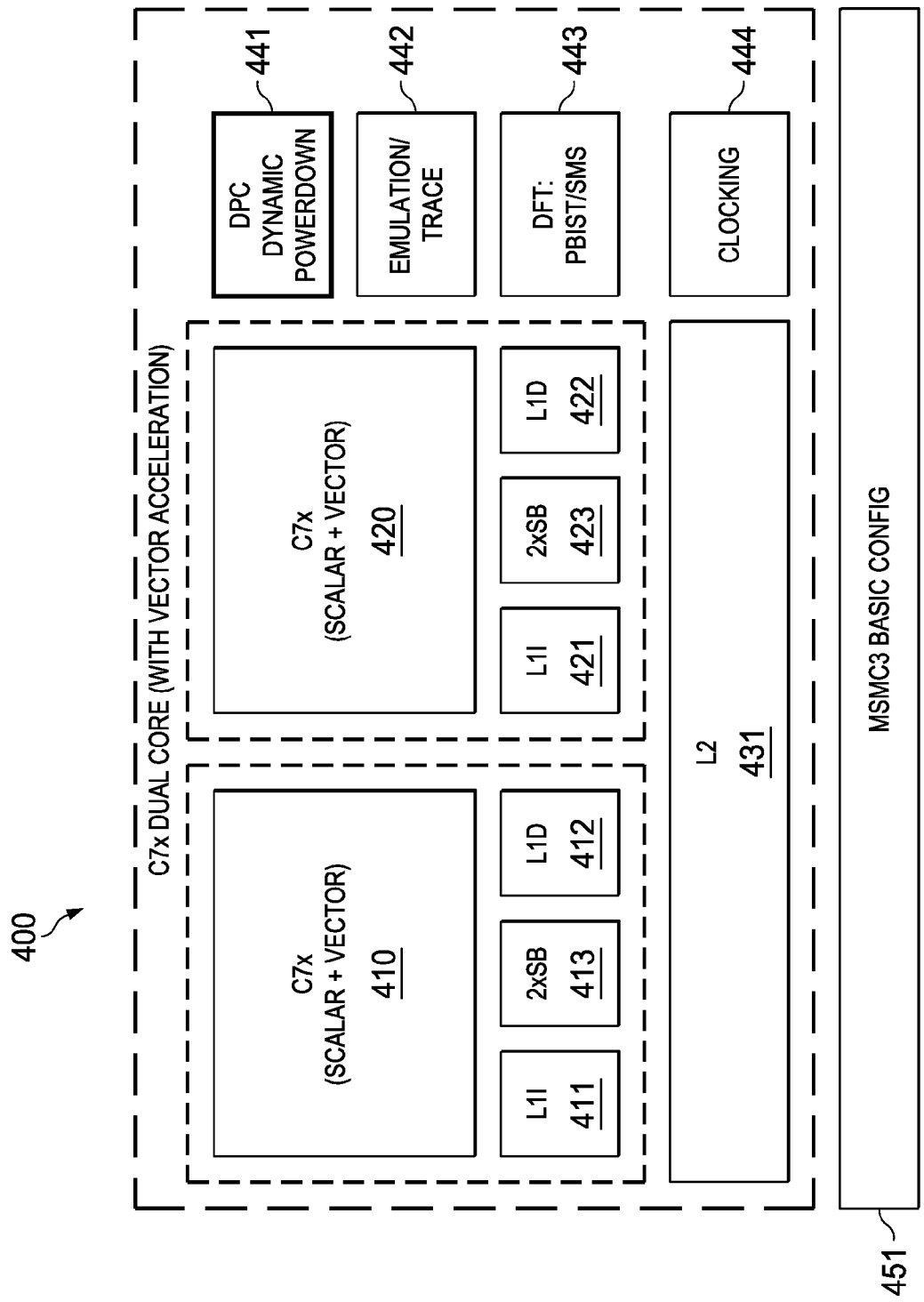
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
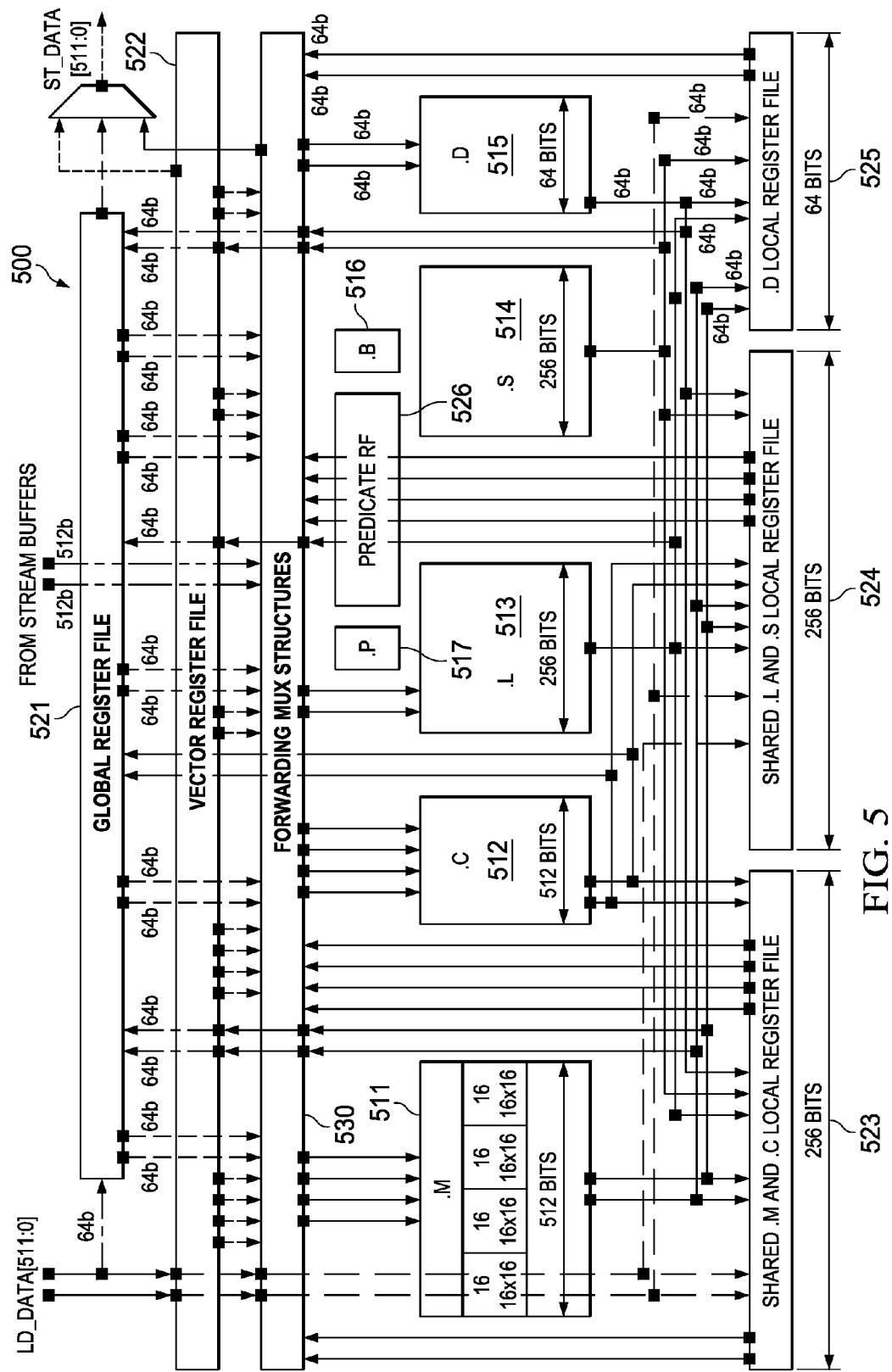
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
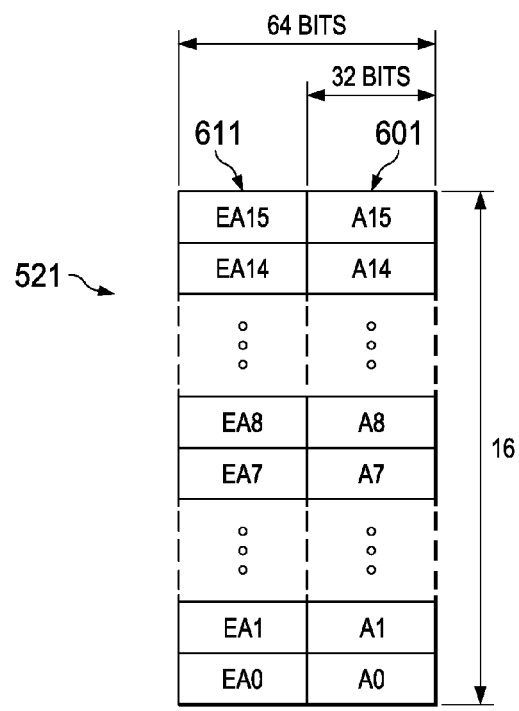
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
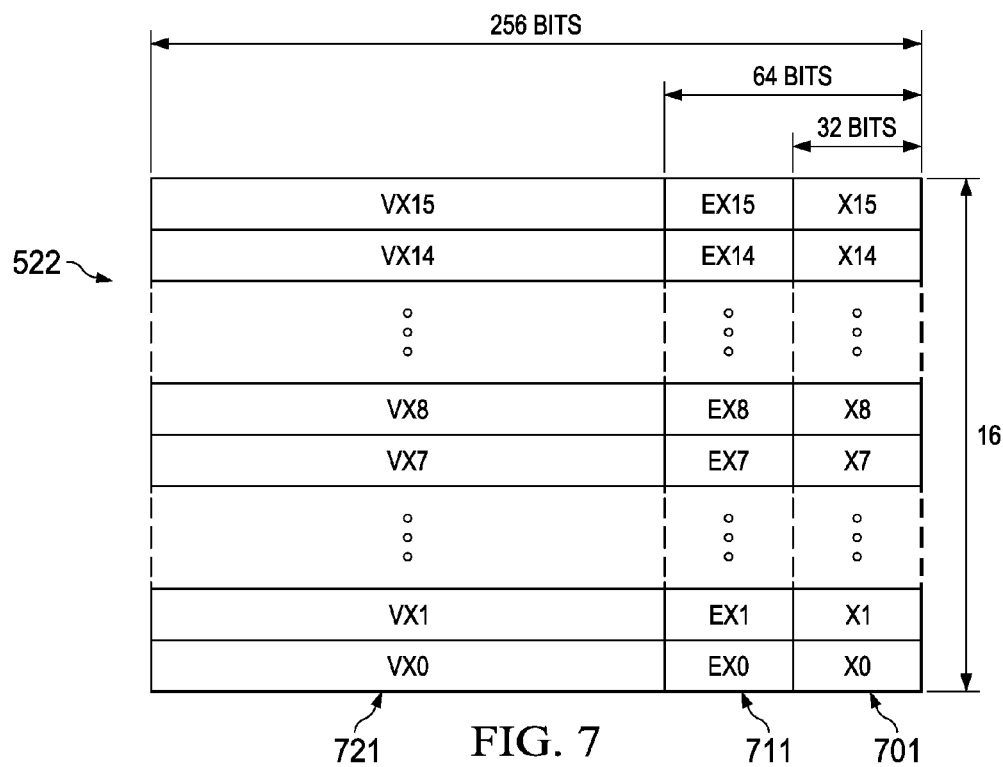
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 701), 64-bits of scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
| --- | --- |
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 701) or 64-bits of scalar data (designated registers ED0 to ED15 711). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

FIG. 10 illustrates the predicate register file 517. There are sixteen registers 32-bit registers in predicate register file 517. Predicate register file 517 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 517. Transfers between predicate register file 517 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
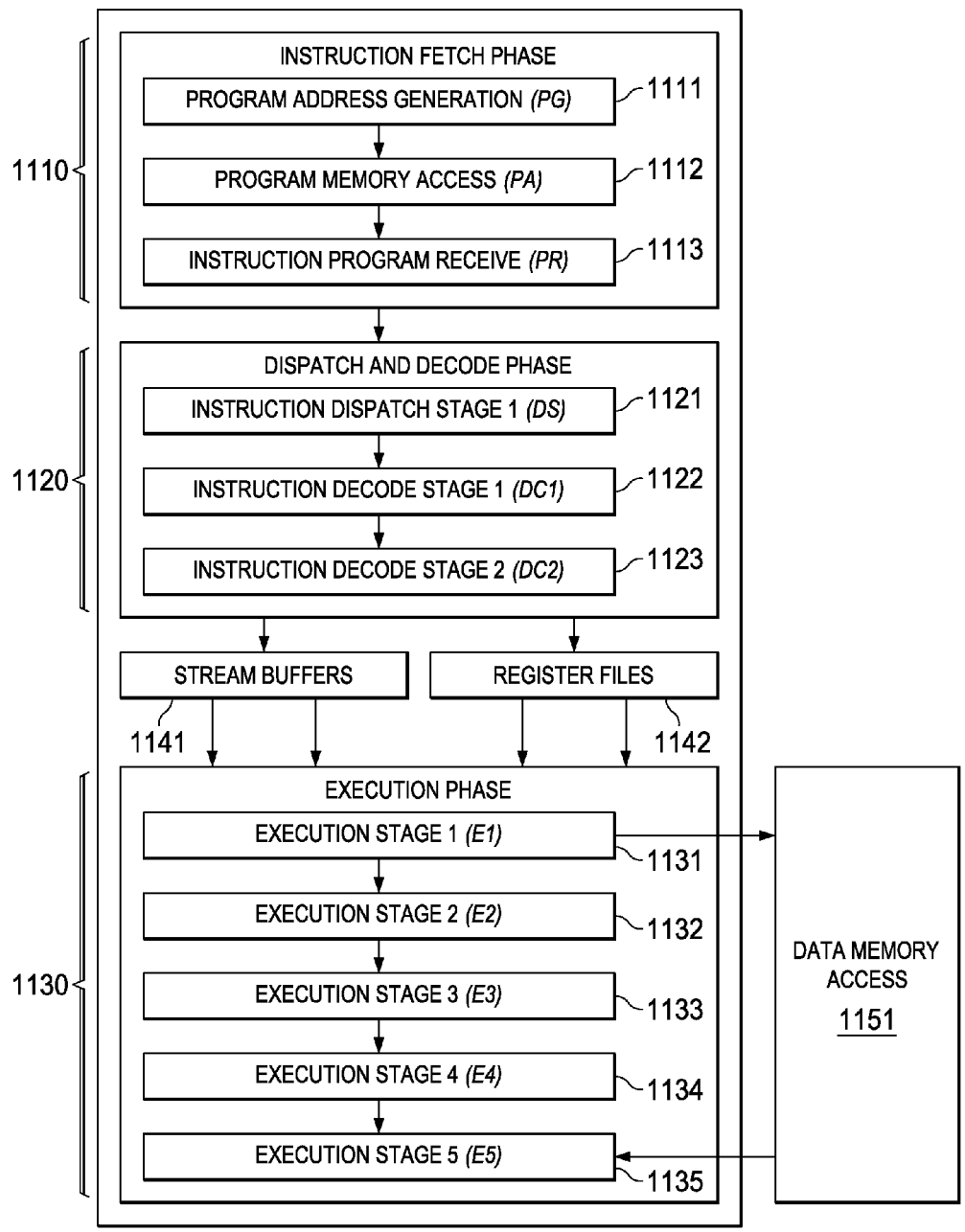
FIG. 11 illustrates the pipeline phases of the central processing unit according to a preferred embodiment of this invention.

FIG. 11 illustrates the following pipeline phases: program fetch phase 1110, dispatch and decode phase 1120 and execution phase 1130. Program fetch phase 1110 includes three stages for all instructions. Dispatch and decode phase 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
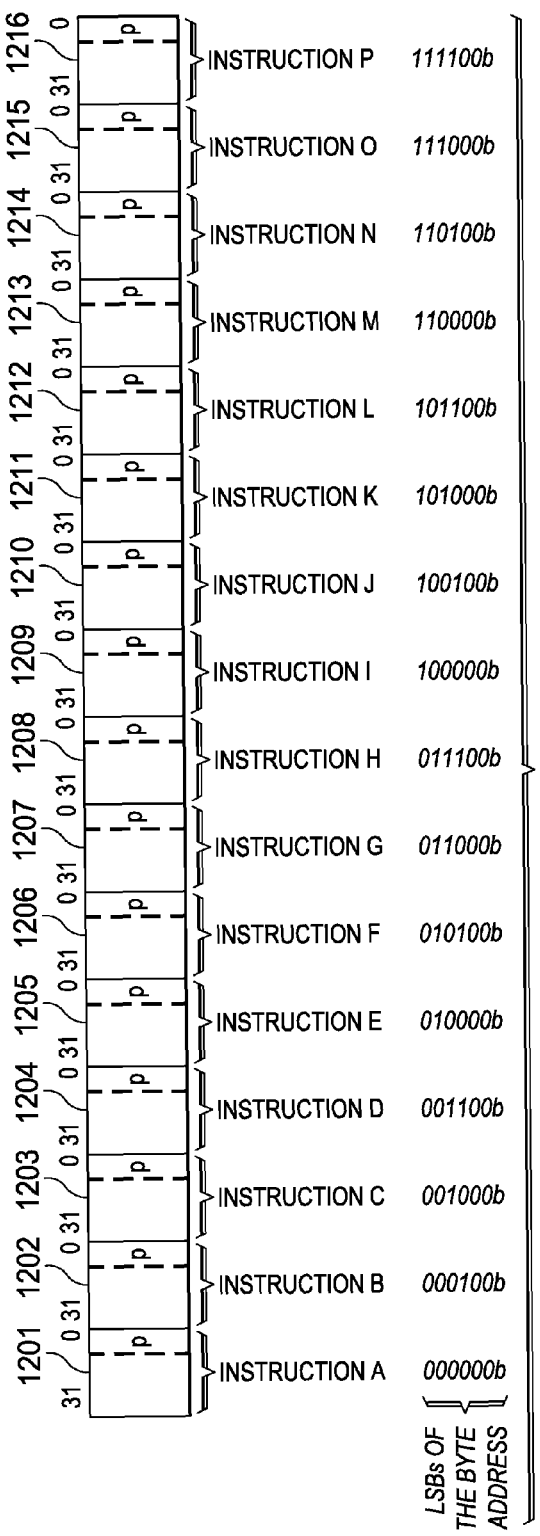
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phase 1120 include instruction dispatch to appropriate execution unit stage 1121 (DS), instruction pre-decode stage 1122 (DC1); and instruction decode, operand reads stage 1223 (DC2). During instruction dispatch to appropriate execution unit stage 1121 (DS) the fetch packets are split into execute packets and assigned to the appropriate functional units. During the instruction pre-decode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
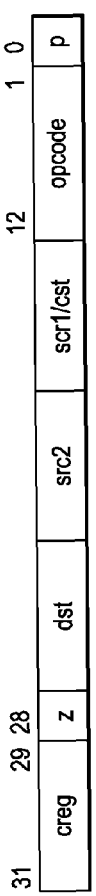
FIG. 13 illustrates an example of the instruction coding of instructions used by this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

|  | Conditional Register | | | |
|---|---|---|---|---|
|  | creg | | | z |
|  | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit CREGZ fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 14:
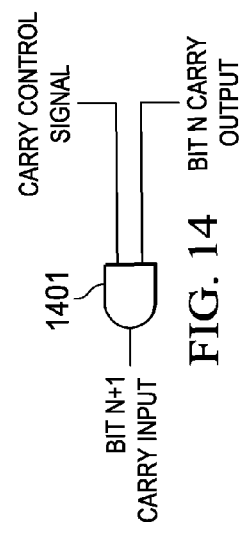
FIG. 14 illustrates the carry control for SIMD operations according to this invention.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals |
| --- | --- |
| 8 bits | –000 0000 0000 0000 0000 0000 0000 0000 |
| 16 bits | –101 0101 0101 0101 0101 0101 0101 0101 |
| 32 bits | –111 0111 0111 0111 0111 0111 0111 0111 |
| 64 bits | –111 1111 0111 1111 0111 1111 0111 1111 |
| 128 bits | –111 1111 1111 1111 0111 1111 1111 1111 |
| 256 bits | –111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Code division multiple access (CDMA) is a spread spectrum wireless telephone technique. The data to be transmitted is exclusive ORed (XOR) with a time varying code to produce the signal transmitted. The data rate is typically less than the chip rate of the code. Each user employs a different code to distinguish its transmission from other transmissions. This is the code division of the name.

On reception, an incoming signal is correlated with the code employed by the desired user. If reception code matches the code used by a particular user, the correlation is large. If the reception does not match the code used by the desired user, the correlation is small. This correlation enables each receiver to "tune" to only the transmissions of the desired other user. In the typical wireless telephone system it is not possible to precisely coordinate timing of code modulation and demodulation. Generally pseudo-noise (PN) codes are employed. PN codes appear random but can be deterministically reproduced in the receiver. PN codes are generally uncorrelated but not orthogonal. Thus a signal with an "off" PN code is seen a noise in a receiver using another PN code.

Thus separation of signals such as at a cell base station requires the receiver to correlate each incoming signal with each PN code. With correlations with PN codes matching the transmitted signal becoming prominent over others, the base station can distinguish multiple users without severe interference. This requires much computation particularly during busy times when many PN codes are employed.

In the prior-art these correlations for Rake finger despread, finger search or path monitoring functions, REAH preamble detection operation and perhaps also the transmit correlator functions including spreading and scrambling were typically handled by a hardware accelerator or a special purpose application specific integrated circuit (ASIC). Generally the amount of processing required was beyond the capability of a programmable digital signal processor (DSP). These solutions are costly in terms of silicon area required and thus cost, power, performance and development time.

This invention is a manner of performing such correlation functions as DSP instructions at a data width permitting real time operation. The invention implements chip rate functionality inside the DSP using an efficient instruction set implementation. This eliminates the needs for a DSP external interface which uses buffers and controls the external accelerator and the DSP. This invention shares hardware for other DSP functions. This invention operates at the DSP clock frequency which is typically faster than the accelerator clock frequency.

Figure 15:
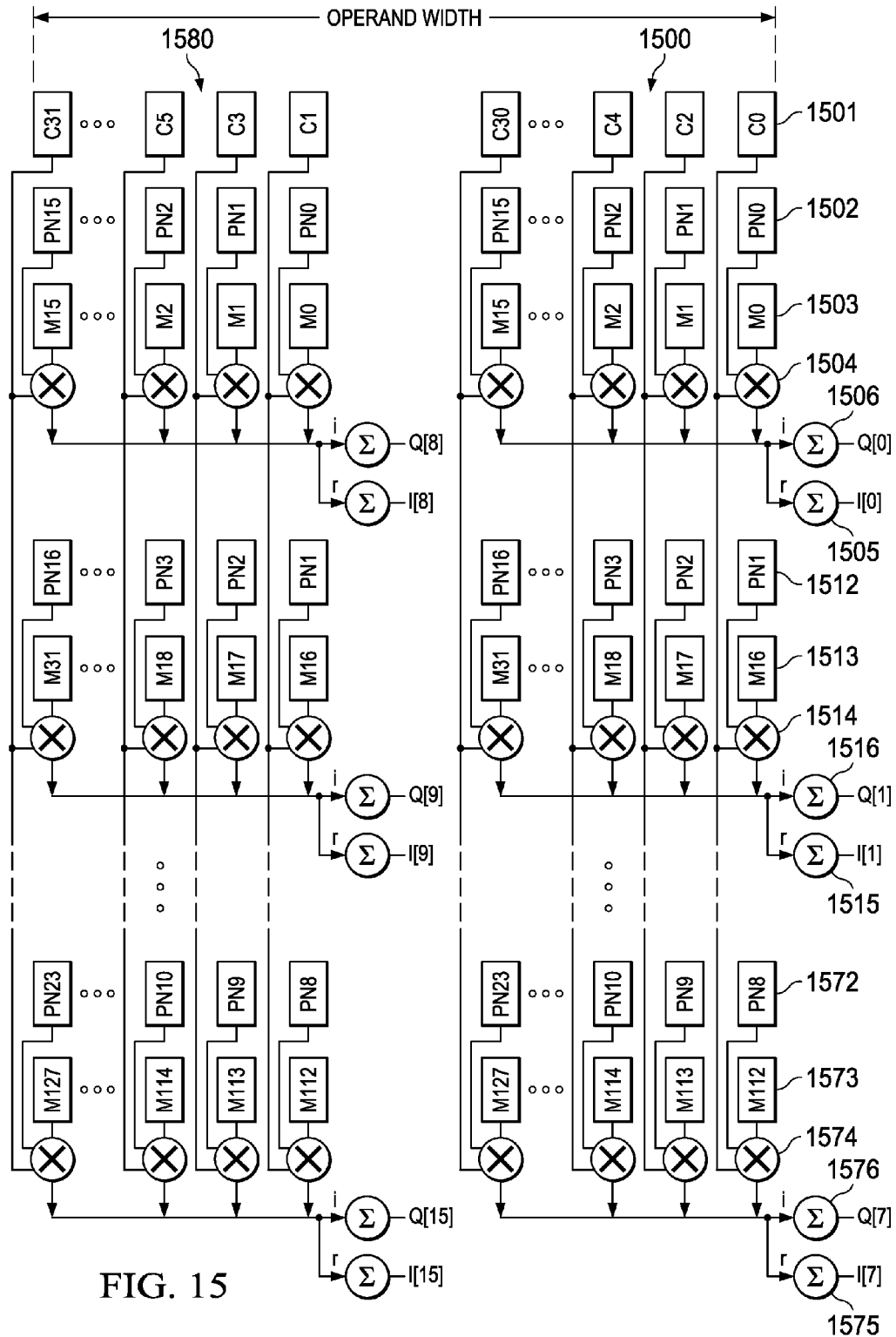
FIG. 15 illustrates a first example of the organization of the correlation unit implementing a class of instructions to perform the correlation operation such as used in a chip rate search operation.

FIG. 15 illustrates organization of correlation unit 512 implementing a class of instructions to perform the correlation operation such as used in a chip rate search operation as described above. The signal input is c from c0 to c31. In accordance with the preferred embodiment of the invention each data word $c_i$ is packed data including a signed real part and a signed imaginary part. The operand width of the correlation unit 512 (512 bits) is divided into an even half 1500 and an odd half 1580. In the preferred embodiment a 512 bit operand is specified by a pair of 256-bit registers. The register number of the operand field of the instruction is limited to an even register number. The 512 bit operand has 256 bits stored in the designated register number and the 256 bits stored in the register with the next higher register number. Even data words of the input C are supplied to even half 1500 (c0, c2, c4 . . . c30) and odd data words are supplied to odd half 1580 (c1, c3, c5 . . . c31). Referring to example parts 1501 to 1506, the correlation unit 512 receives a first input data word 1501 C (preferably specified by a second operand src2 in FIG. 13), a second input data word 1502 PN (preferably specified by a first operand src1 in FIG. 13) and a mask input 1503 (preferably stored in an implicitly specified control register). These three values are multiplied by multiplier 1504. Real portions r(0) of the complex number product are added in summer 1505. Imaginary portions i(0) of the complex number product are added in summer 1506. As shown in FIG. 15 multiplier 1504 receives c input 1501, PN input 1512 and mask input 1513. Real portions r(1) of the complex number product are added in summer 1515. Imaginary portions i(1) of the complex number product are added in summer 1516. Multiplier 1574 receives c input 1501, PN input 1572 and mask input 1573. Real portions r(7) of the complex number product are added in summer 1575. Imaginary portions i(7) of the complex number product are added in summer 1576. The 512 bit results are stored in a register pair corresponding to dst (FIG. 13). The register number of the dst field of the instruction is limited to an even register number. The 256 lower bits of the 512 bit operand are stored in the designated register number and the 256 bits upper bits are stored in the register with the next higher register number.

A first instruction of this class named DVCDOTPM2OPN16B32H receives 32 16 bit complex inputs having 8-bit real parts and 8-bit imaginary parts from c0 to c31 as src2. This instruction receives 24 2-bit PN code codes as src1. The values and coding of these PN codes is described below. This instruction receives 128 1-bit mask input from m0 to m127 from a control register. This instruction produces 16 32 bit complex outputs having 16-bit real parts r(0) to r(15) and 16-bit imaginary parts i(0) to i(15) from multiplying complex c inputs with PN code and Mask and horizontally separately accumulating real and imaginary parts of the products. A PN offset is 2 bits for each consecutive output. The first complex output uses 16 2-bit PN codes and each subsequent complex output uses PN codes which are shifted by 2 bits. This is illustrated in FIG. 15.

A second instruction of this class named DVCDOTPM32OPN16B32H receives 32 16 bit complex inputs having 8-bit real parts and 8-bit imaginary parts from c0 to c31 as src2. This instruction receives 128 2-bit PN code codes as src1. The values and coding of these PN codes is described below. This instruction receives 128 1-bit mask input from m0 to m127 from a control register. This instruction produces 16 32 bit complex outputs having 16-bit real parts r(0) to r(15) and 16-bit imaginary parts i(0) to i(15) from multiplying complex c inputs with PN code and Mask and horizontally separately accumulating real and imaginary parts of the products. A PN offset is 2 bits for each consecutive output. The first complex output uses 16 2-bit PN codes and each subsequent complex output uses PN codes which are shifted by 32 bits. This is similar to that illustrated in FIG. 15.

Figure 16:
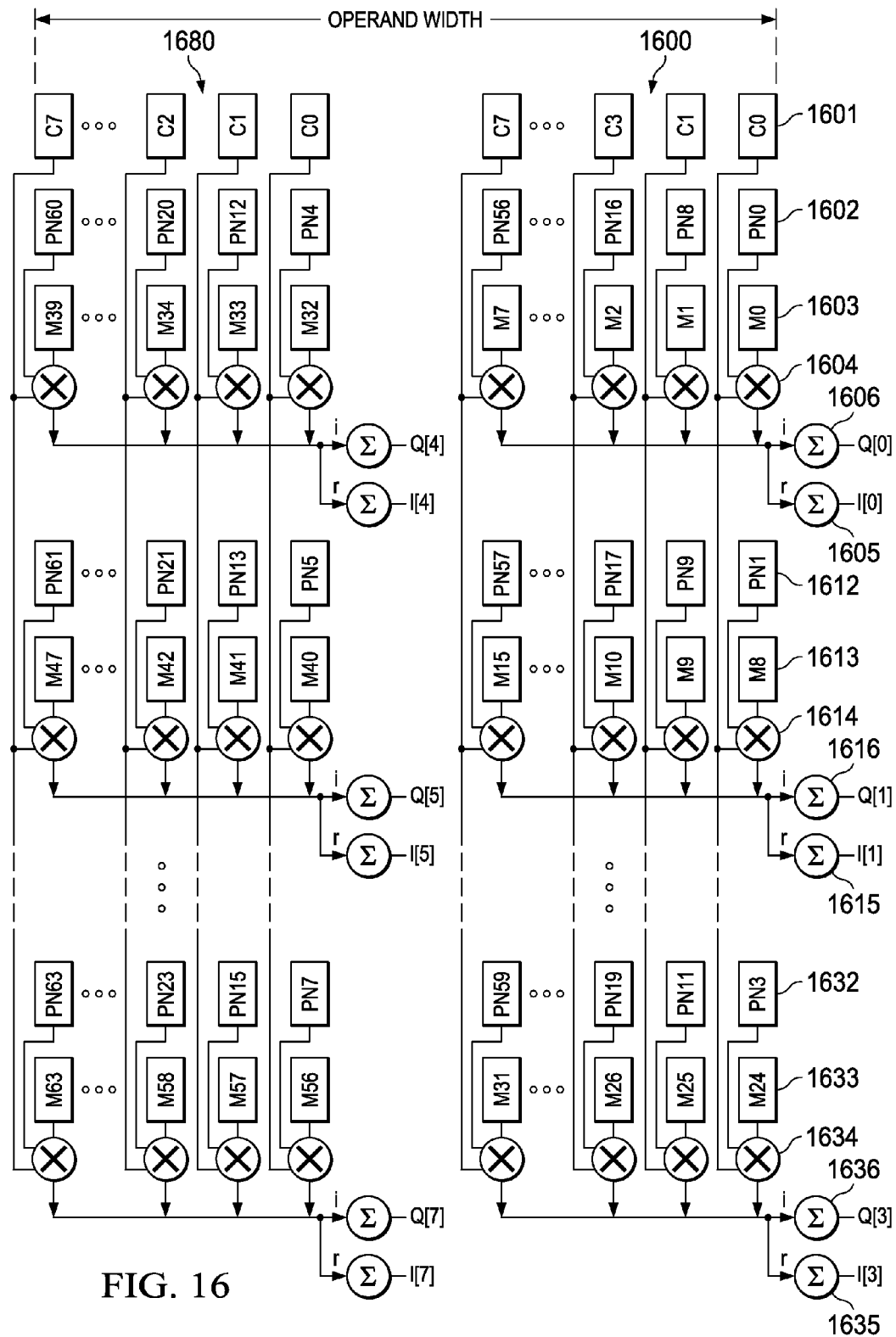
FIG. 16 illustrates a second example of the organization of the correlation unit implementing a class of instructions to perform the correlation operation such as used in a chip rate search operation.

A third instruction of this class named DVCDOTPM2OPN8H16W receives 8 32 bit complex inputs having 16-bit real parts and 16-bit imaginary parts from c0 to c7 as src2. This instruction receives 64 2-bit PN code codes as src1. The values and coding of these PN codes is described below. This instruction receives 64 1-bit mask input from m0 to m63 from a control register. This instruction produces 8 64 bit complex outputs having 32-bit real parts r(0) to r(7) and 32-bit imaginary parts i(0) to i(7) from multiplying complex c inputs with PN code and Mask and horizontally separately accumulating real and imaginary parts of the products. A PN offset is 2 bits for each consecutive output. A first complex output uses sets of 16 bits for 2-bit PN codes and each subsequent complex output uses PN codes which are shifted by 2 bits. This is illustrated in FIG. 16 in which similar parts have similar reference numbers as FIG. 15.

A fourth instruction of this class named DVCDOTPM2OPN8W16W receives 8 64 bit complex inputs having 32-bit real parts and 32-bit imaginary parts from c0 to c7 as src2. This instruction receives 64 2-bit PN code codes as src1. The values and coding of these PN codes is described below. This instruction receives 64 1-bit mask input from m0 to m63 from a control register. This instruction produces 8 64 bit complex outputs having 32-bit real parts r(0) to r(7) and 32-bit imaginary parts i(0) to i(7) from multiplying complex c inputs with PN code and Mask and horizontally separately accumulating real and imaginary parts of the products. A PN offset is 2 bits for each consecutive output. A first complex output uses 8 sets of 16 bits for 2-bit PN codes and each subsequent complex output uses PN codes which are shifted by 2 bits. This is illustrated in FIG. 16 in which similar parts have similar reference numbers as FIG. 15.

Though called multipliers elements 1504, 1514, 1574, 1604, 1614 and 1603 are simplified based upon the nature of the PN code. In accordance with the known art the PN codes can have only the five following values: 1; −1; j; −j; and 0. Mask input m is used for the case PN=0. If PN=0, then the corresponding mask input m is 0, causing the product to be 0. In PN is not 0, then mask input m is 1. As noted above the other PN code allowed values are encoded in a 2-bit code. This 2-bit PN code is shown in Table 5.

TABLE 5

| PN Code | PN Value |
|---------|----------|
| 00 | 1 |
| 01 | j |
| 10 | −j |
| 11 | −1 |

Table 6 shows the product results for all possible values of m and PN. In Table 6 the real input is designated R, which may be 16 bits, 32 bits or 64 bits. Similarly, the imaginary input is designated I, which may be 16 bits, 32 bits or 64 bits.

TABLE 6

| M | PN Code | PN Value | Real Part | Imaginary Part |
|---|---------|----------|-----------|----------------|
| 0 | xx | xx | 0 | 0 |
| 1 | 00 | 1 | R | I |
| 1 | 01 | j | −I | R |
| 1 | 10 | −j | I | −R |
| 1 | 11 | −1 | −R | −I |

The xx designation is a don't care input. The real part R and the imaginary part I of the product are 0 if m is 0 regardless of the PN code or PN value. If the PN value is 1, then product output is R+jI. If the PN value is j, then the product is −I+jR. If the PN value is −j, then the product is I−jR. If the PN value is −1, then the product is −R−jI.

Figure 17:
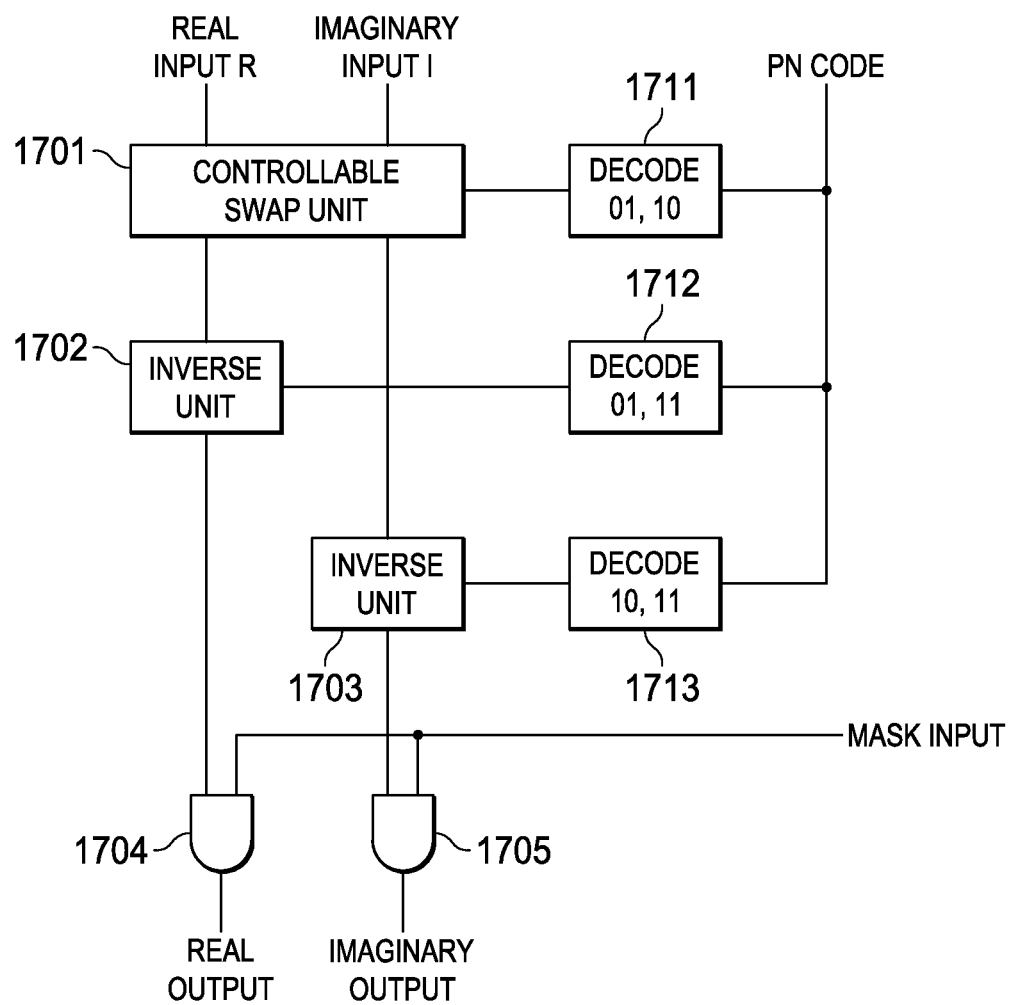
FIG. 17 is a block diagram of the simplified multipliers illustrated in FIGS. 15 and 16.

FIG. 17 is a block diagram of simplified multipliers 1504, 1514, 1574, 1604, 1614 and 1603 implementing the results of Table 6. Real input R and imaginary input I supply two inputs of controllable swap unit 1701. If decoder 1711 determines the PN code is 01 or 10 corresponding to j and −j, then controllable swap unit 1701 swaps the R and I values. Otherwise controllable swap unit 1701 does not swap the R and I values. Inverse unit 1702 performs an arithmetic inversion on its input inverting the real part if decoder 1712 determines the PN code is 01 or 11. This arithmetic inversion may be performed by a two's complement of the input number. The two's complement is based upon the relation −X=−X+1. A two's complement can thus be generated by inverting the number and adding 1. Otherwise inverse unit 1702 leaves its input unchanged. Inverse unit 1703 performs an arithmetic inversion its input inverting the imaginary part if decoder 1713 determines the PN code is 10 or 11. Otherwise inverse unit 1703 leaves its input unchanged. AND gates 1704 and 1705 pass their inputs from respective inverse units 1702 and 1703 if m is 1. Otherwise AND gates 1704 and 1705 output all 0s. As noted above the real input R and the imaginary input I can be 8 bits, 16 bits or 32 bits. Controllable swap unit 1701, inverse units 1702 and 1703 and AND gates 1704 and 1705 have data widths corresponding to the data width of the currently executing instruction. In addition the real output and the imaginary output are zero extended if necessary to the data width of the instruction executing.

In addition to CDMA calculations the PN-codes can be statically programmed to implement FFT or FHT. The PN-codes can be statically programmed according to the radix-4 FFT or Inverse FFT pattern [1:j:−1:−j] or [1:−j:−1:j] to allow the these instructions to implement FFT and Inverse FFT. The PN-codes can be statically programmed to perform +1 (PN code 00) or −1 (PN code 11) multiplication to implement Fast Hadamard Transform (FHT).

The invention provides the advantages of higher performance, less area and power over the prior art. These advantages come because it does not require an external interface to the DSP and it runs at DSP clock speed. The invention enables a higher density transmit chip rate solutions or a higher density RACH preamble detection solution than previously enabled. The invention can carry out 256 complex multiplies per cycle which is greater than the 8 complex multiplies of the DSP prior art.

What is claimed is:

1. A digital signal processor comprising:
    a data register file including a plurality of data registers storing data, each data register designated by a corresponding register number;
    an instruction memory storing instructions each specifying a data processing operation and at least one data operand by register number;
    an instruction decoder connected to said instruction memory for sequentially recalling instructions from said instruction memory and determining said specified data processing operation and said specified at least one operand;
    an operational unit connected to said data register file and said instruction decoder for performing data processing operations upon at least one operand corresponding to an instruction decoded by said instruction decoder, said data processing operations including performing a correlation operation comprising plurality of clusters, each cluster producing a complex number output and including
        a plurality of complex multipliers, each complex multiplier having a first input receiving corresponding separate real part and imaginary part packed within data stored in a first instruction specified data register, a second input receiving corresponding pseudo noise data packed within data stored in a second instruction specified data register, and a real product output and an imaginary product output,
        a real summer connected to said real product output of each complex multiplier in said cluster forming a sum of said real product outputs forming a real part of said complex number output, and
        an imaginary summer connected to said imaginary product output of each complex multiplier in said cluster forming a sum of said imaginary product outputs forming an imaginary part of said complex number output; and
    wherein said pseudo noise data is offset relative to said separate real and imaginary parts packed within data stored in the first instruction specified data register by a differing amount for different clusters.

2. The digital signal processing of claim 1, wherein:
    each of said plurality of complex multipliers of each cluster further receives a mask input, wherein said product output is 0 if corresponding mask input has a first digital state.

3. The digital signal processing of claim 2, wherein:
    each of said plurality of complex multipliers of each cluster comprises:
    a controllable swap unit having a first input receiving a corresponding real part packed within data stored in said first instruction specified data register, a second input receiving a corresponding imaginary part packed within data stored in said first instruction specified data register, a first output, a second output and a control input, said controllable swap unit
        passing data received at said first input to said first output and data received at said second input to said second output upon receiving a first digital signal at said control input, and
        passing data received at said first input to said second output and data received at said second input to said first output upon receiving a second digital signal opposite to said first digital signal at said control input,
    a first arithmetic inverse unit having an input connected to said first output of said controllable swap unit, an output and a control input, said first arithmetic inverse unit
        passing data received at said input to said output unchanged upon receiving a first digital signal at said control input, and
        forming an arithmetically inverse of said data received at said input and passing said arithmetically inverse data to said output upon receiving a second digital signal at said control input,
    a second arithmetic inverse unit having an input connected to said second output of said controllable swap unit, an output and a control input, said second arithmetic inverse unit
        passing data received at said input to said output unchanged upon receiving a first digital signal at said control input, and
        forming an arithmetic inverse of said data received 38 at said input and passing said arithmetic inverse data to said output upon receiving a second digital signal at said control input,
    a first OR gate having a first input connected to said output of said first arithmetic inverse unit, a second input receiving said mask input and an output producing a real output of said multiplier,
    a second OR gate having a first input connected to said output of said second arithmetic inverse unit, a second input receiving said mask input and an output producing an imaginary output of said multiplier,
    a first decoder receiving corresponding pseudo noise data having an output connected to said control input of said controllable swap unit
        generating a first digital signal if said corresponding pseudo noise data is 1 or −1, and
        generating a second digital signal if said corresponding pseudo noise data is j or −j,
    a second decoder receiving corresponding pseudo noise data having an output connected to said control input of said first arithmetic inverse unit
        generating a first digital signal if said corresponding pseudo noise data is 1 or −j, and
        generating a second digital signal if said corresponding pseudo noise data is j or −1, and
    a third decoder receiving corresponding pseudo noise data having an output connected to said control input of said second arithmetic inverse unit generating a first digital signal if said corresponding pseudo noise data is 1 or j, and generating a second digital signal if said corresponding pseudo noise data is −j or −1.

4. The digital signal processing of claim 3, wherein:

said second instruction specified data register stores said corresponding pseudo noise data packed in a two bit code, wherein "00" indicates a pseudo noise data value of 1, "01" indicates a pseudo noise data value of j, "10" indicates a pseudo noise data value of −j and "11" indicates a pseudo noise data value of −1.

5. The digital signal processing of claim 3, wherein:

said instructions stored in said instruction memory each specifying a data width of said specified processing operation;

said instruction decoder further determining said specified data width of said specified processing operation; and said controllable swap unit, said first arithmetic inverse unit, said second arithmetic inverse unit, said first OR gate and said second OR gate are configured to have a data width corresponding to said specified data width of said specified processing operation.

6. The digital signal processor of claim 1, wherein:

said clusters are divided into a first half receiving separate real and imaginary parts packed within even slots of data stored in said first instruction specified data register and a second half receiving separate real and imaginary parts packed within odd slots of data stored in said first instruction specified data register.

7. The digital signal processor of claim 1, wherein:

said pseudo noise data has one of the values of the set 1, j, −j and −1.

8. The digital signal processor of claim 7, wherein:

said real product output of each multiplier is said real part input and said imaginary product output of each multiplier is said imaginary part input if said pseudo noise data is 1;

said real product output of each multiplier is an arithmetic inverse of said imaginary part input and said imaginary product output of each multiplier is said real part input if said pseudo noise data is j;

said real product output of each multiplier is said imaginary part input and said imaginary product output of each multiplier is an arithmetic inverse of said real part input if said pseudo noise data is −j; and said real product output of each multiplier is an arithmetic inverse of said real part input and said imaginary product output of each multiplier is an arithmetic inverse of said imaginary part input if said pseudo noise data is −1.

9. The digital signal processor of claim 1, wherein:

said instructions stored in said instruction memory further specify a data destination by a register number; and said operational unit is further operable to store said complex number outputs as packed data within a data register specified by said data destination of said corresponding instruction.

* * * * *